(12) United States Patent
Susarla et al.

(10) Patent No.: US 8,615,734 B2
(45) Date of Patent: Dec. 24, 2013

(54) SYSTEM AND METHOD FOR DYNAMICALLY REDEFINING CLASS FILES IN AN APPLICATION SERVER ENVIRONMENT

(75) Inventors: Srinagesh Susarla, Fremont, CA (US); Abe White, Houston, TX (US); Rajendra Inamdar, North Chelmsford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1030 days.

(21) Appl. No.: 12/266,369

(22) Filed: Nov. 6, 2008

(65) Prior Publication Data

US 2009/0125881 A1      May 14, 2009

Related U.S. Application Data

(60) Provisional application No. 60/986,926, filed on Nov. 9, 2007.

(51) Int. Cl.
*G06F 9/44* (2006.01)

(52) U.S. Cl.
USPC .......................................... 717/110; 717/111

(58) Field of Classification Search
USPC .................................. 717/100–178
See application file for complete search history.

(56) References Cited

U.S. PATENT DOCUMENTS

| 5,854,932 | A | * | 12/1998 | Mariani et al. | 717/116 |
| 5,918,052 | A | * | 6/1999 | Kruskal et al. | 717/100 |
| 5,978,582 | A | * | 11/1999 | McDonald et al. | 717/104 |
| 6,836,884 | B1 | * | 12/2004 | Evans et al. | 717/140 |
| 6,917,944 | B1 | * | 7/2005 | Prasad et al. | 707/781 |
| 7,210,137 | B1 | * | 4/2007 | Tamma | 717/143 |
| 7,493,601 | B2 | * | 2/2009 | Gimness et al. | 717/131 |
| 7,827,522 | B2 | * | 11/2010 | Hussey | 717/105 |
| 7,996,828 | B2 | * | 8/2011 | Massmann et al. | 717/168 |
| 8,407,678 | B2 | * | 3/2013 | Greene | 717/134 |
| 2004/0230956 | A1 | * | 11/2004 | Cirne et al. | 717/128 |
| 2006/0074994 | A1 | * | 4/2006 | Smits | 707/201 |

OTHER PUBLICATIONS

Ivan T. Bowman, Michael W. Godfrey, and Richard C, Holt("Extracting Source Models from Java Programs: Parse, Disassemble, or Profile?"), Sep. 6, 1999,retreived from"http://plg.math.uwaterloo.ca/~migod/papers/1999/paste99.pdf", 6 pages.*

* cited by examiner

*Primary Examiner* — Anna Deng
*Assistant Examiner* — Brahim Bourzik

(57) ABSTRACT

Disclosed herein is a system and method for dynamically redefining class files in a Java-based development environment. The existing development cycle in Java generally requires developers to edit, build, and deploy before they can test changes to the code. This process can be quite time consuming. There is a need for dynamically redefining and testing class files in a development environment without a significant time delay or loss of data. In one embodiment, when a developer modifies the class definition a ClassFileTransformer function is used to maintain the original shape of a redefinable class, i.e. its declared fields and methods, without affecting the redefined class' behavior or appearance to outside code.

17 Claims, 18 Drawing Sheets

```
800  public class Base {
802    private String _name;
804    private int _age;

806    public String getName() {
         return (_name == null) ? "<default>" : _name;
       }

808    public void setName(String name) {
         if (name == null)
           throw new IllegalArgumentException();
         _name = name;
       }

810    public int getAge() {
         return Math.max(0, _age);
       }

812    public void setAge(int age) {
         if (age < 0)
           throw new IllegalArgumentException();
         _age = age;
       }

814    public String toString() {
         return getName() + "::" + getAge();
       }
     }

816  public class Sub extends Base {
818    private String _ssn;

820    public String getSSN() {
         return _ssn
       }

822    public void setSSN(String ssn) {
         _ssn = ssn;
       }

824    public String toString() {
         return super.toString() + "::" + getSSN();
       }
     }
```

Fig. 8

```
900  public class Base {
902    private String _name;
904    private int _age;

906    public String getName() {
           return Version0.getName(this);
       }

908    public void setName(String name) {
           Version0.setName(this, name);
       }

910    public int getAge() {
           return Version0.getAge(this);
       }

912    public void setAge(int age) {
           Version0.setAge(this, age);
       }

914    public String toString() {
           return Version0.toString(this);
       }

916    private final AddedFields AddedFields = new AddedFields(2);

918    public Object Invoke(Object... args, int methodIndex) {
           switch (methodIndex) {
           case 0: return Version0.getName(this);
           case 1: Version0.setName(this, (String)args[0]); return null;
           case 2: return Version0.getAge(this);
           case 3: Version0.setAge(this, (int)args[0]); return null;
           case 4: return Version0.toString(this);
           default: throw new NoSuchMethodError();
           }
       } private Object InvokeSuper(Object... args, int methodIndex) {
           throw new NoSuchMethodError();
       } public boolean FetchBooleanField(int fieldIndex) {
           throw new NoSuchFieldError();
       } public byte FetchByteField(int fieldIndex) {
           throw new NoSuchFieldError();
       } public char FetchCharField(int fieldIndex) {
           throw new NoSuchFieldError();
       } public double FetchDoubleField(int fieldIndex) {
           throw new NoSuchFieldError();
       } public float FetchFloatField(int fieldIndex) {
           throw new NoSuchFieldError();
       }
```

```
public int FetchIntField(int fieldIndex) {
    switch (fieldIndex) {
    case 1: return _age;
    default: throw new NoSuchFieldError();
    }
} public long FetchLongField(int fieldIndex) {
    throw new NoSuchFieldError();
} public short FetchShortField(int fieldIndex) {
    throw new NoSuchFieldError();
} public Object FetchObjectField (int fieldIndex) {
    switch (fieldIndex) {
    case 0: return _name;
    default: throw new NoSuchFieldError();
    }
} public void StoreBooleanField(boolean value, int fieldIndex) {
    throw new NoSuchFieldError();
} public void StoreByteField(byte value, int fieldIndex) {
    throw new NoSuchFieldError();
} public void StoreCharField(char value, int fieldIndex) {
    throw new NoSuchFieldError();
} public void StoreDoubleField(double value, int fieldIndex) {
    throw new NoSuchFieldError();
} public void StoreFloatField(float value, int fieldIndex) {
    throw new NoSuchFieldError();
} public void StoreIntField(int value, int fieldIndex) {
    switch (fieldIndex) {
    case 1: _age = value; break;
    default: throw new NoSuchFieldError();
    }
} public void StoreLongField(long value, int fieldIndex) {
    throw new NoSuchFieldError();
} public void StoreShortField(short value, int fieldIndex) {
    throw new NoSuchFieldError();
}
```

Fig. 9B

```
       public void StoreObjectField(Object value, int fieldIndex) {
           switch (fieldIndex) {
           case 0: _name = (String) value; break;
           default: throw new NoSuchFieldError();
           }
       }
   }
920│ private static class Version0 {
       public static String getName(Base instance) {
           return (instance._name == null)
               ? "<default>" : instance._name;
       }

922│   public static void setName(Base instance, String name) {
           if (name == null)
               throw new IllegalArgumentException();
           instance._name = name;
       }

924│   public static int getAge(Base instance) {
           return Math.max(0, instance._age);
       }

926│   public static void setAge(Base instance, int age) {
           if (age < 0)
               throw new IllegalArgumentException();
           instance._age = age;
       }

928│   public static String toString(Base instance) {
           return instance.getName() + "::" + instance.getAge();
       }
   }
930│ public class Sub extends Base {
932│   private String _ssn;

934│   public String getSSN() {
           return Version0.getSSN(this);
       }

936│   public void setSSN(String ssn) {
           Version0.setSSN(this, ssn);
       }

938│   public String toString() {
           return Version0.toString(this);
       }

940│   private final AddedFields AddedFields = new AddedFields(1001);

942│   public Object Invoke(Object... args, int methodIndex) {
           switch (methodIndex) {
           case 1000: return Version0.getSSN(this);
           case 1001: Version0.setSSN(this,(String)args[0]);return null;
           case 4: return Version0.toString(this);
           default: return super.Invoke(args, methodIndex);
           }
       }
   }
```

```
private Object InvokeSuper(Object... args, int methodIndex) {
    return super.Invoke(args, methodIndex);
} public boolean FetchBooleanField(int fieldIndex) {
    return super.FetchBooleanField(fieldIndex);
} public byte FetchByteField(int fieldIndex) {
    return super.FetchByteField(fieldIndex);
} public char FetchCharField(int fieldIndex) {
    return super.FetchCharField(fieldIndex);
} public double FetchDoubleField(int fieldIndex) {
    return super.FetchDoubleField(fieldIndex);
} public float FetchFloatField(int fieldIndex) {
    return super.FetchFloatField(fieldIndex);
} public int FetchIntField(int fieldIndex) {
    return super.FetchIntField(fieldIndex);
} public long FetchLongField(int fieldIndex) {
    return super.FetchLongField(fieldIndex);
} public short FetchShortField(int fieldIndex) {
    return super.FetchShortField(fieldIndex);
} public Object FetchObjectField (int fieldIndex) {
    switch (fieldIndex) {
    case 1000: return _name;
    default: return super.FetchObjectField(fieldIndex);
    }
} public void StoreBooleanField(boolean value, int fieldIndex) {
    super.StoreBooleanField(value, fieldIndex);
} public void StoreByteField(byte value, int fieldIndex) {
    super.StoreByteField(value, fieldIndex);
} public void StoreCharField(char value, int fieldIndex) {
    super.StoreCharField(value, fieldIndex);
} public void StoreDoubleField(double value, int fieldIndex) {
    super.StoreDoubleField(value, fieldIndex);
}
```

```
        public void StoreFloatField(float value, int fieldIndex) {
            super.StoreFloatField(value, fieldIndex);
        } public void StoreIntField(int value, int fieldIndex) {
            super.StoreIntField(value, fieldIndex);
        } public void StoreLongField(long value, int fieldIndex) {
            super.StoreLongField(value, fieldIndex);
        } public void StoreShortField(short value, int fieldIndex) {
            super.StoreShortField(value, fieldIndex);
        } public void StoreObjectField(Object value, int fieldIndex) {
            switch (fieldIndex) {
            case 1000: _ssn = (String)value; break;
            default: super.StoreObjectField(value, fieldIndex);
            }
        }

944     private static class Version0 {
            public static String getSSN(Sub instance) {
                return instance._ssn;
            }

946         public static void setSSN(Sub instance, String ssn) {
                instance._ssn = ssn;
            }

948         public static String toString(Sub instance) {
                return instance.InvokeSuper(null, 4)
                    + "::" + instance.getSSN();
            }
        }
    }
```

Fig. 9E

```
1000  public class Base {
1002      private String _name;
1004      // private int _age;
1006      private long _id;

1008      public String getName() {
              return (_name == null) ? "<default>" : _name;
          }

1010      public void setName(String name) {
              if (name == null)
                  throw new IllegalArgumentException();
              _name = name;
          }

/*
1012      public int getAge() {
              return Math.max(0, _age);
          }

1014      public void setAge(int age) {
              if (age < 0)
                  throw new IllegalArgumentException();
              _age = age;
          }
          */

1016      public String toString() {
              return getName() + "::" + getId();
          }

1018      public long getId() {
              return _id;
          }

1020      public void setId(long id) {
              if (id < 0)
                  throw new IllegalArgumentException();
              _id = id;
          }
      }
```

Fig. 10

```
1100   public class Base {
1102       private String _name;
1104       private int _age;

1106       public String getName() {
               return Version1.getName(this);
           }

1108       public void setName(String name) {
               Version1.setName(this, name);
           }

1110       public int getAge() {
               throw new NoSuchMethodError();
           }

1112       public void setAge(int age) {
               throw new NoSuchMethodError();
           }

1114       public String toString() {
               return Version1.toString(this);
           }

1116       private final AddedFields AddedFields = new AddedFields(2);

1118       public Object Invoke(Object... args, int methodIndex) {
               switch (methodIndex) {
               case 0: return Version1.getName(this);
               case 1: Version0.setName(this, (String)args[0]); return null;
               case 4: return Version1.toString(this);
               case 5: return Version1.getId(this);
               case 6: Version1.setId(this, (long)args[0]); return null;
               default: throw new NoSuchMethodError();
               }
           } private Object InvokeSuper(Object... args, int methodIndex) {
               throw new NoSuchMethodError();
           } public boolean FetchBooleanField(int fieldIndex) {
               throw new NoSuchFieldError();
           } public byte FetchByteField(int fieldIndex) {
               throw new NoSuchFieldError();
           } public char FetchCharField(int fieldIndex) {
               throw new NoSuchFieldError();
           } public double FetchDoubleField(int fieldIndex) {
               throw new NoSuchFieldError();
           } public float FetchFloatField(int fieldIndex) {
               throw new NoSuchFieldError();
           }
```

11A

```
public int FetchIntField(int fieldIndex) {
   throw new NoSuchMethodError();
} public long FetchLongField(int fieldIndex) {
   switch (fieldIndex) {
   case 2: return AddedFields.fetchLongField(fieldIndex);
   default: throw new NoSuchFieldError();
   }
} public short FetchShortField(int fieldIndex) {
   throw new NoSuchFieldError();
} public Object FetchObjectField (int fieldIndex) {
   switch (fieldIndex) {
   case 0: return _name;
   default: throw new NoSuchFieldError();
   }
} public void StoreBooleanField(boolean value, int fieldIndex) {
   throw new NoSuchFieldError();
} public void StoreByteField(byte value, int fieldIndex) {
   throw new NoSuchFieldError();
} public void StoreCharField(char value, int fieldIndex) {
   throw new NoSuchFieldError();
} public void StoreDoubleField(double value, int fieldIndex) {
   throw new NoSuchFieldError();
} public void StoreFloatField(float value, int fieldIndex) {
   throw new NoSuchFieldError();
} public void StoreIntField(int value, int fieldIndex) {
   throw new NoSuchFieldError();
} public void StoreLongField(long value, int fieldIndex) {
   switch (fieldIndex) {
   case 1: AddedFields.storeLongField(value, fieldIndex); break;
   default: throw new NoSuchFieldError();
   }
} public void StoreShortField(short value, int fieldIndex) {
   throw new NoSuchFieldError();
}
```

11C

```
public void StoreObjectField(Object value, int fieldIndex) {
    switch (fieldIndex) {
    case 0: _name = (String) value; break;
    default: throw new NoSuchFieldError();
    }
} private static class Version1 {
    public static String getName(Base instance) {
        return (instance._name == null)
            ? "<default>" : instance._name;
    } public static void setName(Base instance, String name) {
        if (name == null)
            throw new IllegalArgumentException();
        instance._name = name;
    } public static String toString(Base instance) {
        return instance.getName()
            + "::" + instance.Invoke(null, 5);
    } public static long getId(Base instance) {
        return instance.FetchLongField(2);
    } public static void setId(Base instance, long id) {
        if (id < 0)
            throw new IllegalArgumentException();
        instance.StoreLongField(id, 2);
    }
}
}
```

1120 — private static class Version1
1122 — public static void setName
1124 — public static String toString
1126 — public static long getId
1128 — public static void setId

Fig. 11C

SYSTEM AND METHOD FOR DYNAMICALLY REDEFINING CLASS FILES IN AN APPLICATION SERVER ENVIRONMENT

CLAIM OF PRIORITY

This application claims benefit to the following U.S. Provisional Patent Application:

U.S. Provisional Patent Application No. 60/986,926 entitled "System and Method for Dynamically Redefining Class Files in an Application Server Environment," by Srinagesh Susarla, Abe White and Rajendra Inamdar, filed Nov. 9, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to Java-based development environments, and in particular to a system and method for dynamically redefining classes within such an environment.

BACKGROUND

In the area of software application development, software application developers expect to make changes to a deployed application and see the changes immediately, e.g. by refreshing the browser. Frameworks built using interpreted languages such as Ruby and Python enable such functionality. These languages allow entire applications to be refreshed without an explicit build or deploy cycle. Java, however, typically requires developers to edit, build, and deploy before finally testing their changes to the code. This development cycle can be time consuming. One way to reduce development time is to use an Integrated Development Environment (IDE) which combines the Edit and Build steps by providing auto-incremental compilation support.

FIG. 1 describes a typical development cycle developers must go through to see the results of changes to their applications. In step 100 the developer edits the application. In step 102 the developer builds the application after completing the changes the developer wished to make. Once the build cycle is complete, in step 104 the developer can then deploy or redeploy the application. In step 106, the application is ready to be tested. In an iterative development cycle, where these steps are repeated until a final version is created, development time can be significant.

SUMMARY

Disclosed herein is a system and method for dynamically redefining class files in a Java-based development environment. The existing development cycle in Java generally requires developers to edit, build, and deploy before they can test changes to the code. This process can be quite time consuming. There is a need for dynamically redefining and testing class files in a development environment without a significant time delay or loss of data. In one embodiment, when a developer modifies the class definition a ClassFileTransformer function is used to maintain the original shape of a redefinable class, i.e. its declared fields and methods, without affecting the redefined class' behavior or appearance to outside code.

BRIEF DESCRIPTION OF THE FIGURES

FIG. 8 shows an example of class files in code in accordance with an embodiment.

FIG. 9 shows an example of a transformation process in accordance with an embodiment.

FIG. 10 shows an example of modified class files in accordance with an embodiment.

FIG. 11 shows an example of a transformation process of modified class files in accordance with an embodiment.

DETAILED DESCRIPTION

Disclosed herein is a system and method for dynamically redefining class files in a Java-based development environment. The existing development cycle in Java generally requires developers to edit, build, and deploy before they can test changes to the code. This process can be quite time consuming. There is a need for dynamically redefining and testing class files in a development environment without a significant time delay or loss of data. In one embodiment, when a developer modifies the class definition a ClassFileTransformer function is used to maintain the original shape of a redefinable class, i.e. its declared fields and methods, without affecting the redefined class' behavior or appearance to outside code.

Figure 1:
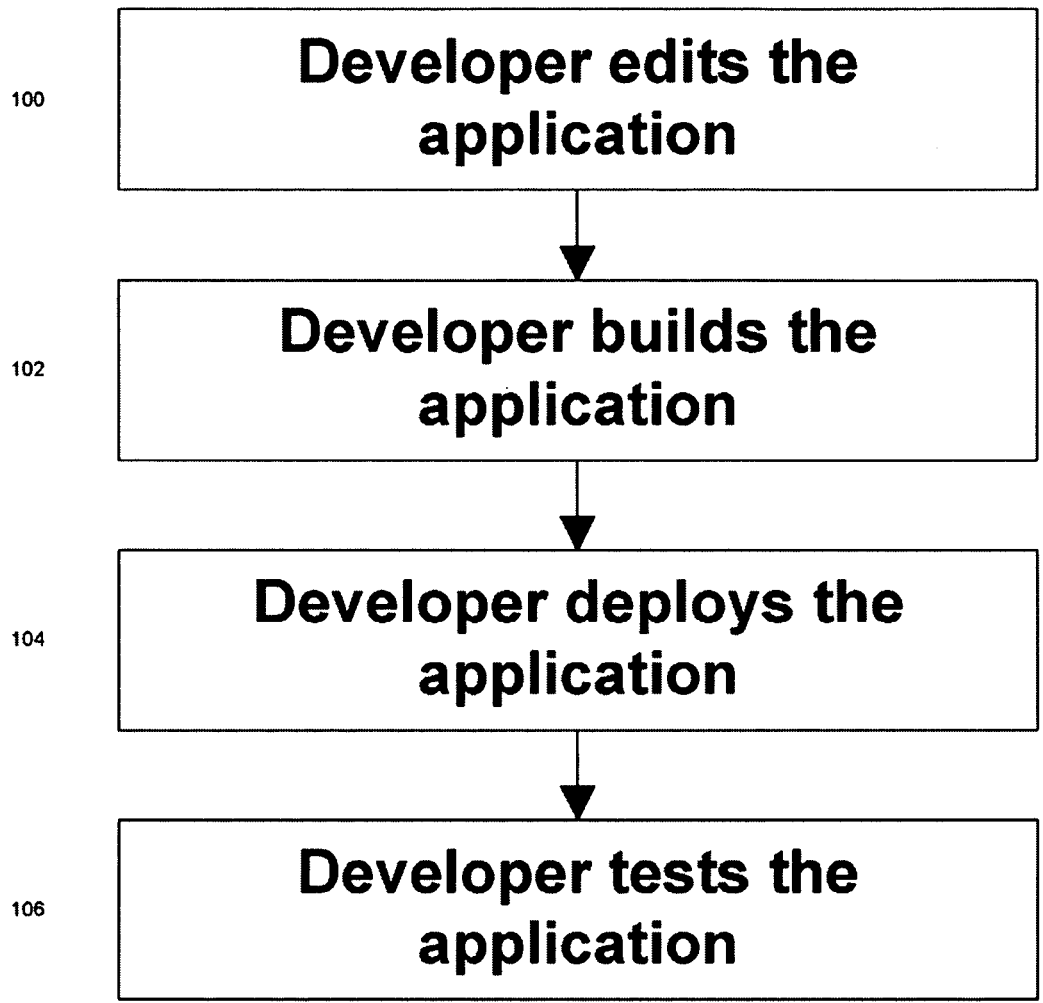
FIG. 1 shows a flowchart of a typical development cycle developers must go through to see the results of changes to their applications.
Figure 2:
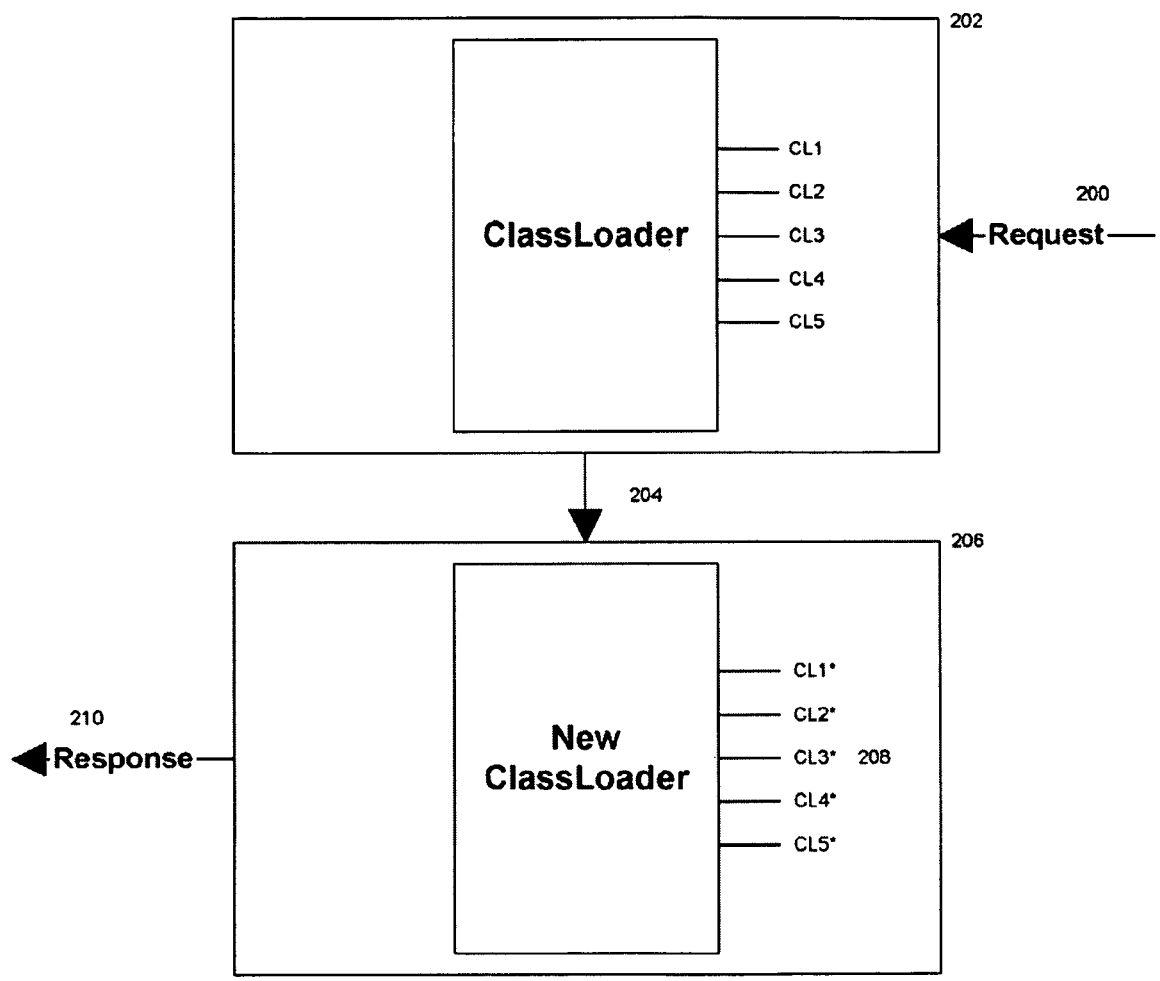
FIG. 2 shows an illustration of a development cycle that eliminates the deploy cycle.

FIG. 2 shows one method of eliminating the deploy cycle. The deploy cycle is successfully eliminated by using a ClassLoader that can detect changes to classes on disk 202. When the ClassLoader detects any changes 204, it destroys itself and then loads a new ClassLoader 206 with the contents of the previous ClassLoader incorporating the detected changes 208. Only after the new ClassLoader is created and loaded can the original request 200 be processed 210. This method has two main drawbacks. The process is very time consuming and it loses all non-serializable state data as well as all running Servlets, Filters, and Listeners.

Java 5 introduces the ability to redefine a class at runtime without dropping its ClassLoader or abandoning existing instances through the use of a Java agent. This can vastly improve the speed of iterative development cycles and improve the development experience for the developer. This ability in Java 5 is limited by two requirements. First, Java 5 requires all Java agents to be declared at the command line.

Second, the class has to maintain its declared fields and methods, i.e. its shape. Java 6 eliminates the first requirement but keeps the second.

As described above, Java enables the redefinition of classes at runtime, but only to method bodies and class attributes. The class shape—the class' declared fields and methods—can never change. Maintaining class shape while altering class members poses two major problems: 1) how can external code access fields and methods that did not exist in the original class definition, and how are attempts to access fields and methods that do not exist detected; and 2) where are the new fields and methods stored since they cannot be added to the new class without altering its shape.

In one embodiment, the ClassFileTransformer function addresses the first problem through the use of synthetic methods. The synthetic methods allow outside code to access any field or invoke any method using the field and method indices maintained by the metadata structure. The ClassFileTransformer function then replaces direct access to the members of redefinable types with calls to the synthetic methods throughout the codebase. This layer of indirection allows the ClassFileTransformer function to reroute attempts to access new members, and to detect erroneous attempts to access members which no longer exist.

In one embodiment, the second problem is addressed through the use of a synthetic field of type AddedFields and an inner class unique to the current redefinable class version. All of the fields of each class are indexed. AddedFields acts as a map of added field indices to their values. Instead of allowing one class to call another class' fields directly, such calls are replaced at the byte code level with a method call. For example, Class A tries to access a field on Class B. This call is replaced so Class A instead calls a method on class B, giving class B the number of the field it wants to access. Then Class B uses a table to lookup what data corresponds to the number. For original fields it uses the field that was already coded by the developer in the class. Fields added subsequently to the class are contained in another lookup table, the AddedFields construct.

In one embodiment, the ClassFileTransformer function creates an inner class that is unique to the current redefinable class version. The methods of the original class are copied to the inner class. Because this inner class is created and loaded on each redefinition, members can be added or changed without violating the restrictions imposed by Java. This allows the redefinable class to behave as though it has new members without changing its shape.

In one embodiment, the ClassFileTransformer function uses a metadata structure that stores and indexes information for all redefinable classes. In one embodiment, the metadata structure is capable of at least parsing redefinable class bytes without loading the class; maintaining a monotonically increasing class version number; representing the set of members of the latest class definition as well as all previous definitions; differentiating between the members of the original class and members of the redefined class; creating and maintaining an index of class members; and maintaining polymorphism by indexing overriding subclass methods to the same index as the superclass method.

Figure 3:
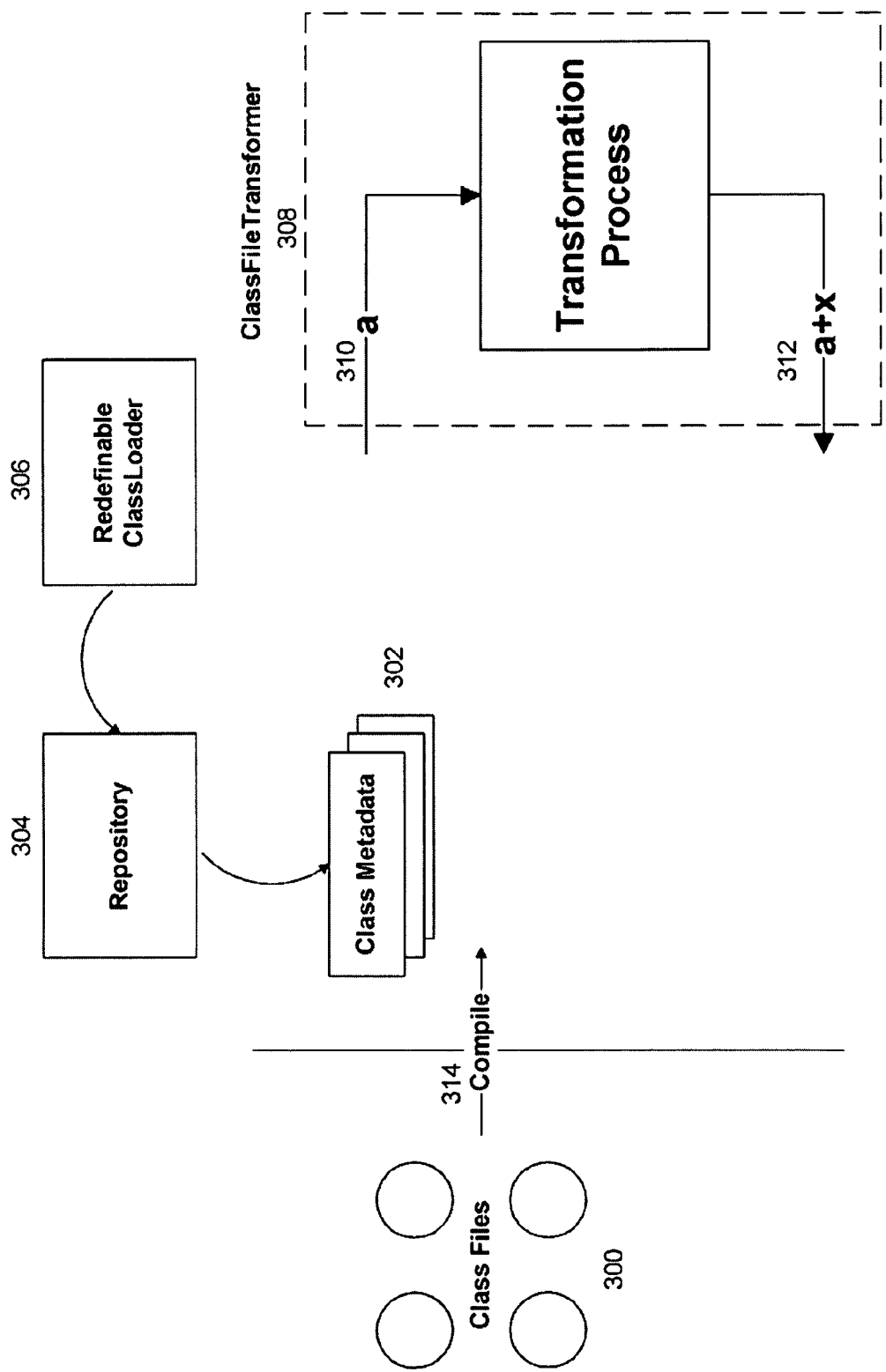
FIG. 3 shows a system for transforming a class in accordance with an embodiment.

FIG. 3 shows a system for transforming a class in accordance with an embodiment. The repository 304 stores class metadata. The class metadata is supplied by the redefinable classloader 306. The class files 300 are compiled 314 and compared with the class metadata 302. The redefinable classloader detects changes to redefinable classes and supplies the changes to the metadata structure. At 308 the class files are transformed. The class bytes 310 enter the process and exit the process 312 transformed. The transformation can include adding synthetic methods, synthetic fields and other additions and changes shown below.

Figure 4:
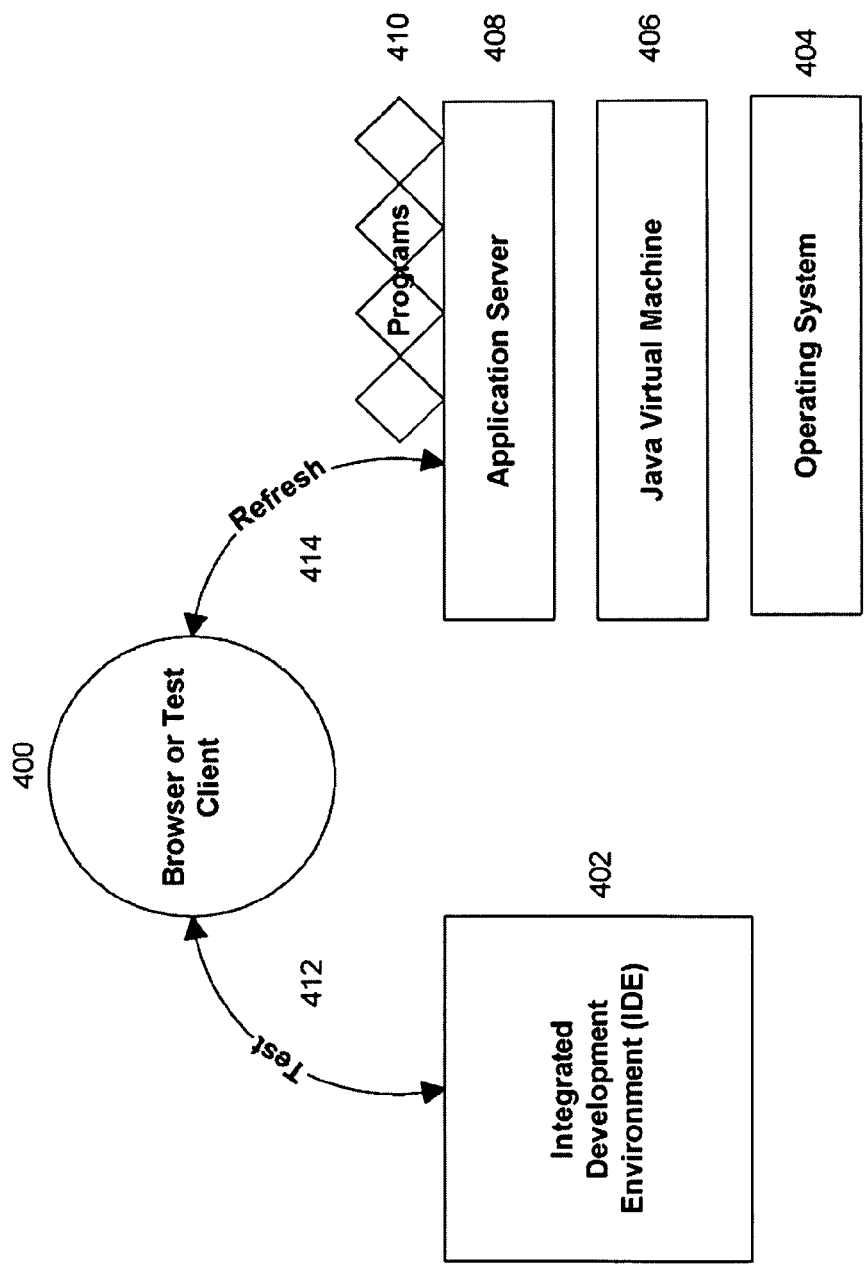
FIG. 4 shows a development environment in accordance with an embodiment.

FIG. 4 shows a development environment in accordance with an embodiment. The developer edits a web application in an Integrated Development Environment (IDE) 402. Preferably the IDE supports compilation on changes, eliminating the need for a separate build cycle. After editing the web application the developer can refresh 414 the browser or test client 400 the developer is using to test the web application 412. The web application is deployed to an application server 408 which can also contain other programs 410. The application server can be from any number of vendors including WebLogic Server from Oracle Corporation, Inc., of Redwood Shores, Calif. The application server runs on a Java Virtual Machine (JVM) 406 which can also be from any number of vendors including JRockit from Oracle Corporation. The JVM runs on an operating system 404.

Figure 5A:
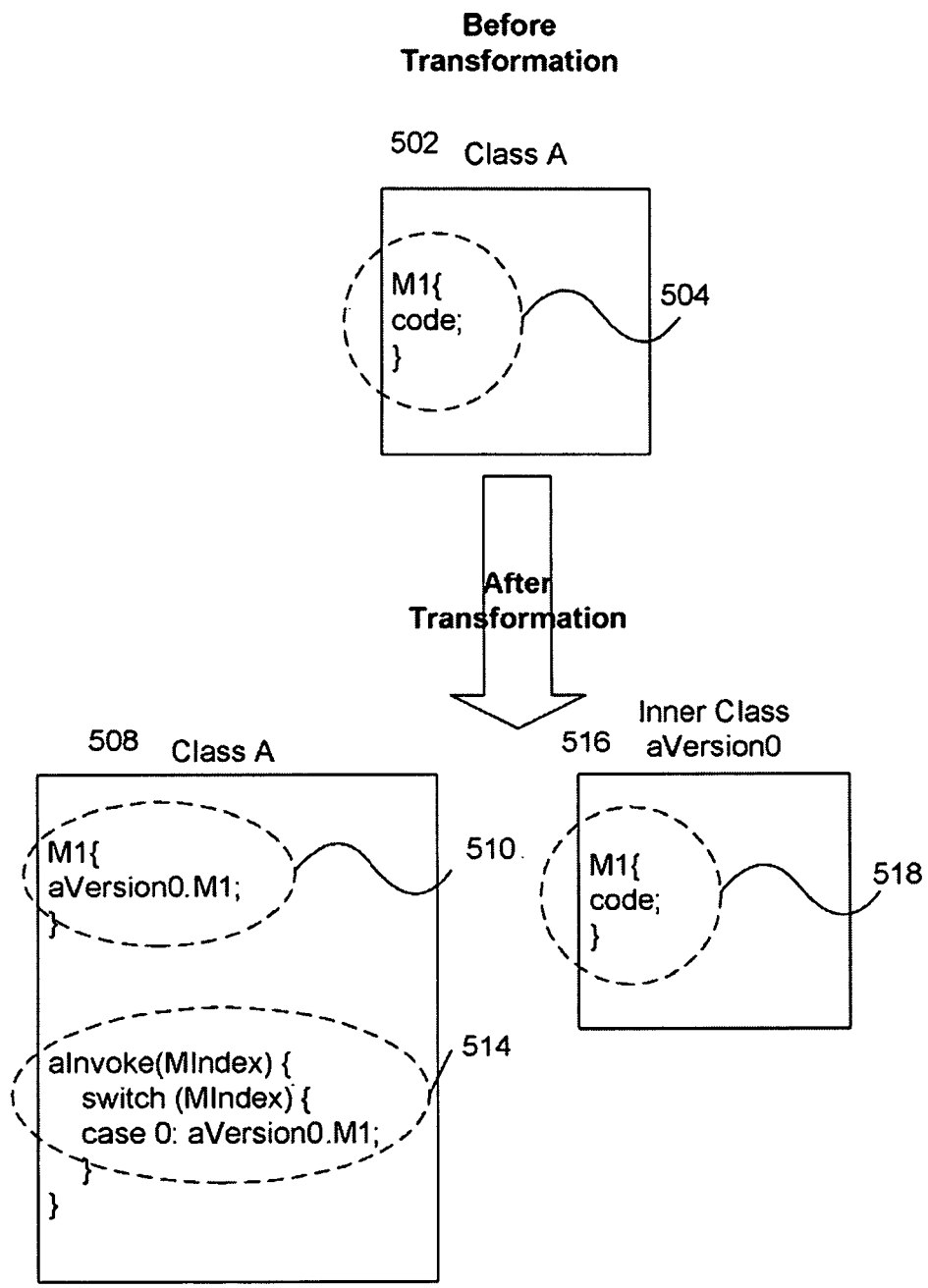
FIG. 5 shows two before and after diagrams of a transformation in accordance with an embodiment.
Figure 5B:
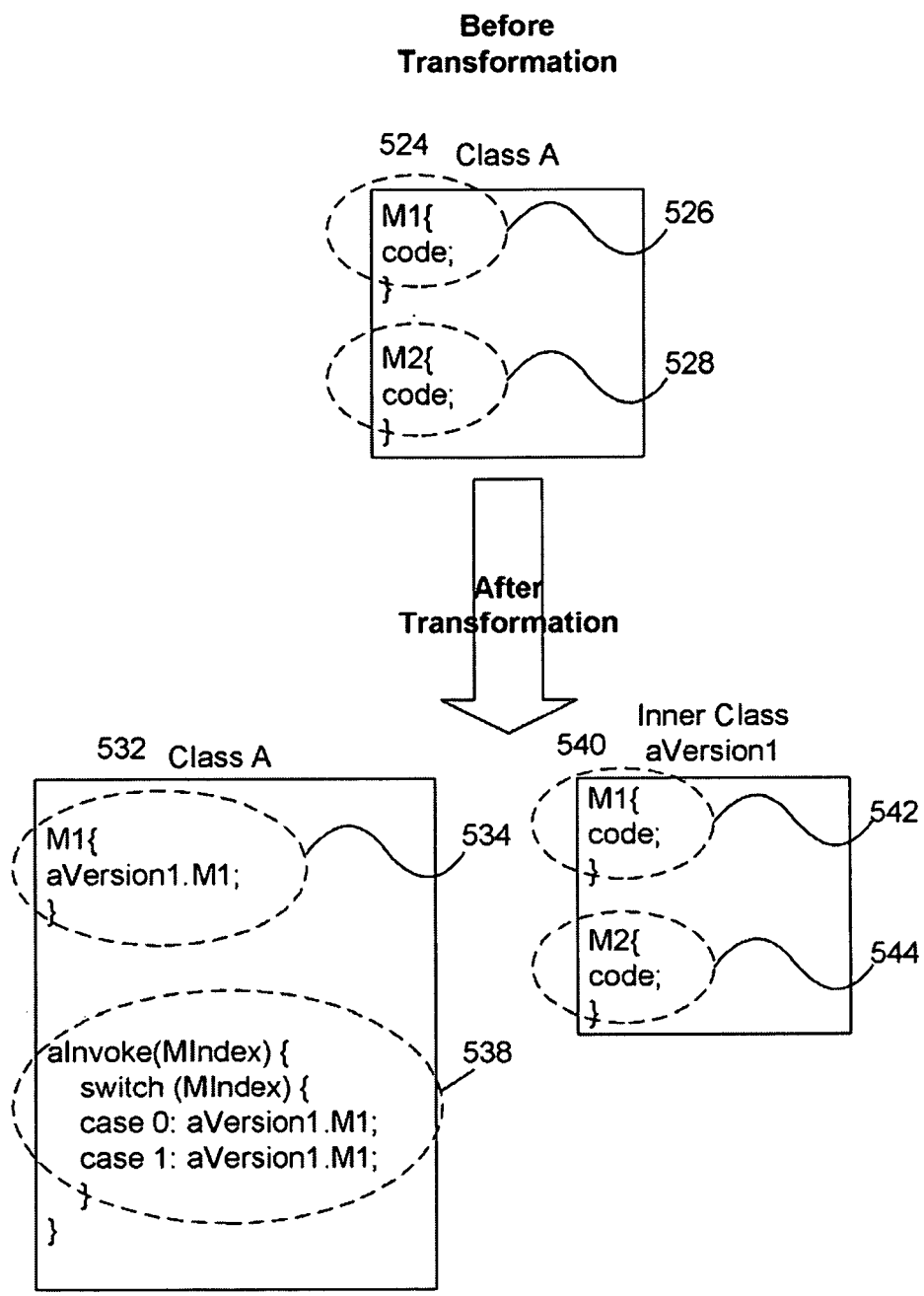

FIG. 5 shows a transformation process in more detail in accordance with an embodiment. FIG. 5 shows two before and after diagrams of a transformation process, the first in FIG. 5A, the second in FIG. 5B. A developer creates a redefinable class 502 named Class A. Class A contains one method 504, named M1. The developer refreshes the browser or integrated development environment and a Java Agent and a ClassLoader detect changes made to Class A. The ClassLoader and Java Agent register a ClassFileTransformer and the ClassFileTransformer transforms Class A. The transformed Class A 508 contains a method 510 named M1 and a method 514 named aInvoke. Additionally, the ClassFileTransformer created an inner class 516 named aVersion0. The ClassFileTransformer copies the original method M1, 504, to aVersion0 516 as shown at 518. In the transformed Class A, 508, the ClassFileTransformer modifies method M1, 510, with a call to the method M1, 518, of aVersion0 516. The ClassFileTransformer also creates a method 514 named aInvoke in the transformed Class A 508. The aInvoke method, 514, is used by outside code to invoke the methods of Class A. It contains a switch statement using the method index from the metadata structure.

As shown in FIG. 5B, the system allows a developer to make changes to Class A, 502, to create a modified Class A, 524. The developer makes no changes to M1, which remains the same at both 504 and 526 but the developer adds a second method M2, 528. Because Class A must maintain its shape it follows that both 508 and 532, which represent the transformed Class A in each diagram, have the same methods and fields. The two transformed Class As in FIGS. 5A and 5B, 508 and 532, differ only in the method body of aInvoke. In the aInvoke method in 508, another case is added to the switch statement to correspond with M2, 528. Both methods M1 526 and M2 528, of the modified Class A 524, are moved to the new inner class 540, aVersion1. Though Class A has maintained its shape, the updated aInvoke method 538 enables outside code to invoke M2. This gives Class A the behavior in accordance with the developer's modifications 520 while also meeting the requirements imposed by Java as described above.

Figure 6:
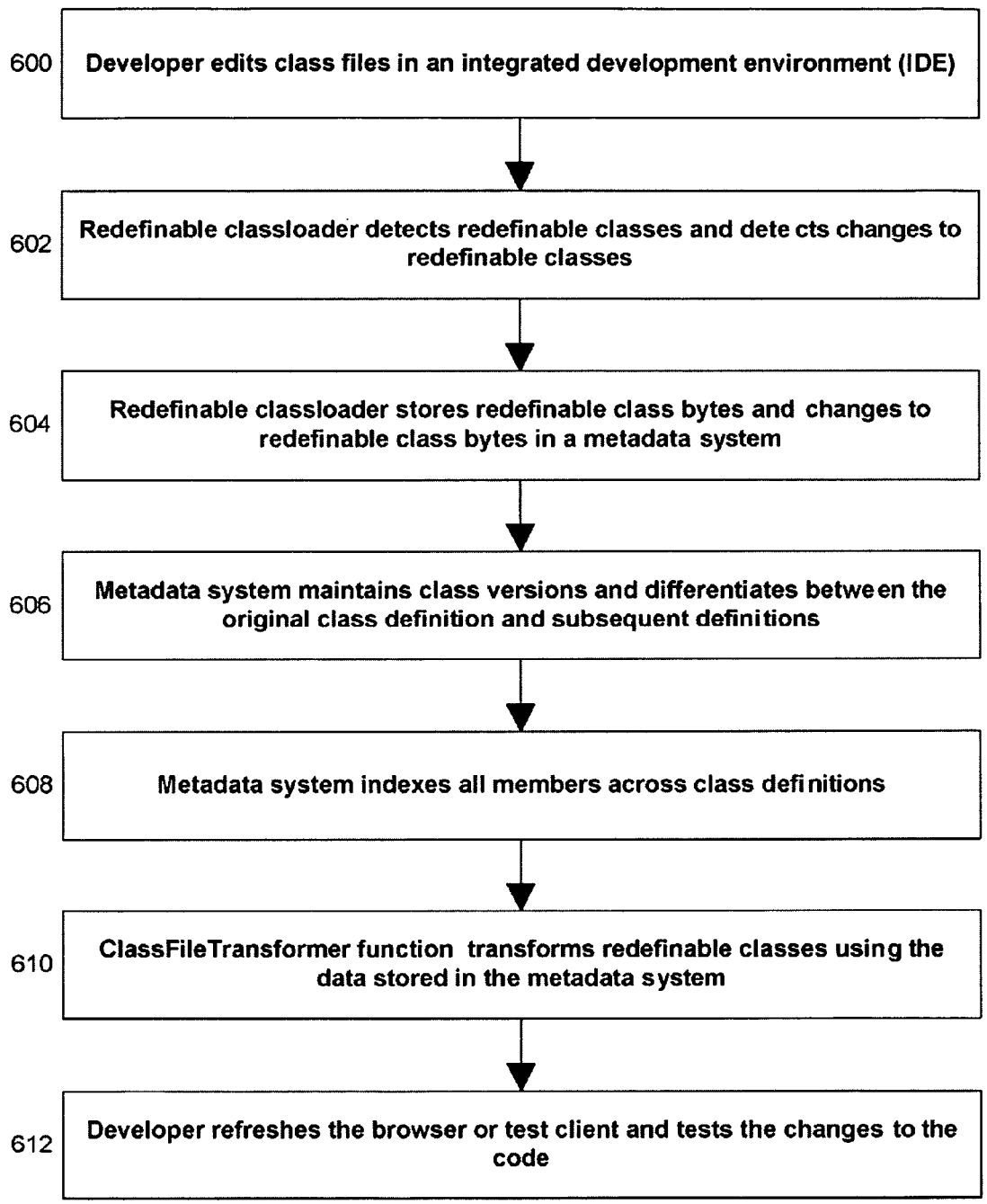
FIG. 6 shows a flowchart of a method of transforming a class in accordance with an embodiment.

FIG. 6 shows a flowchart of a method of transforming a class in accordance with an embodiment. At step 600, the developer edits the code for an application. Preferably, the developer edits using an integrated development environment (IDE) which supports compilation on changes. At step 602, the redefinable classloader detects redefinable classes and changes to redefinable classes. At step 604, the redefinable classloader stores redefinable class bytes and changes to redefinable class bytes to a metadata structure. At step 608, the metadata structure indexes all members across class definitions. At step 610 the ClassFileTransformer function transforms redefinable classes using the data stored in the metadata structure as described above. At step 610, the developer refreshes the browser or test client and tests the changes made to the code. The developer can edit and test the code without performing the traditional deploy cycle.

In one embodiment, a method for dynamically redefining classes in an application server environment comprises: detecting and storing redefinable classes; indexing all class members; detecting changes to at least one class file; and transforming at least one class file.

Figure 7:
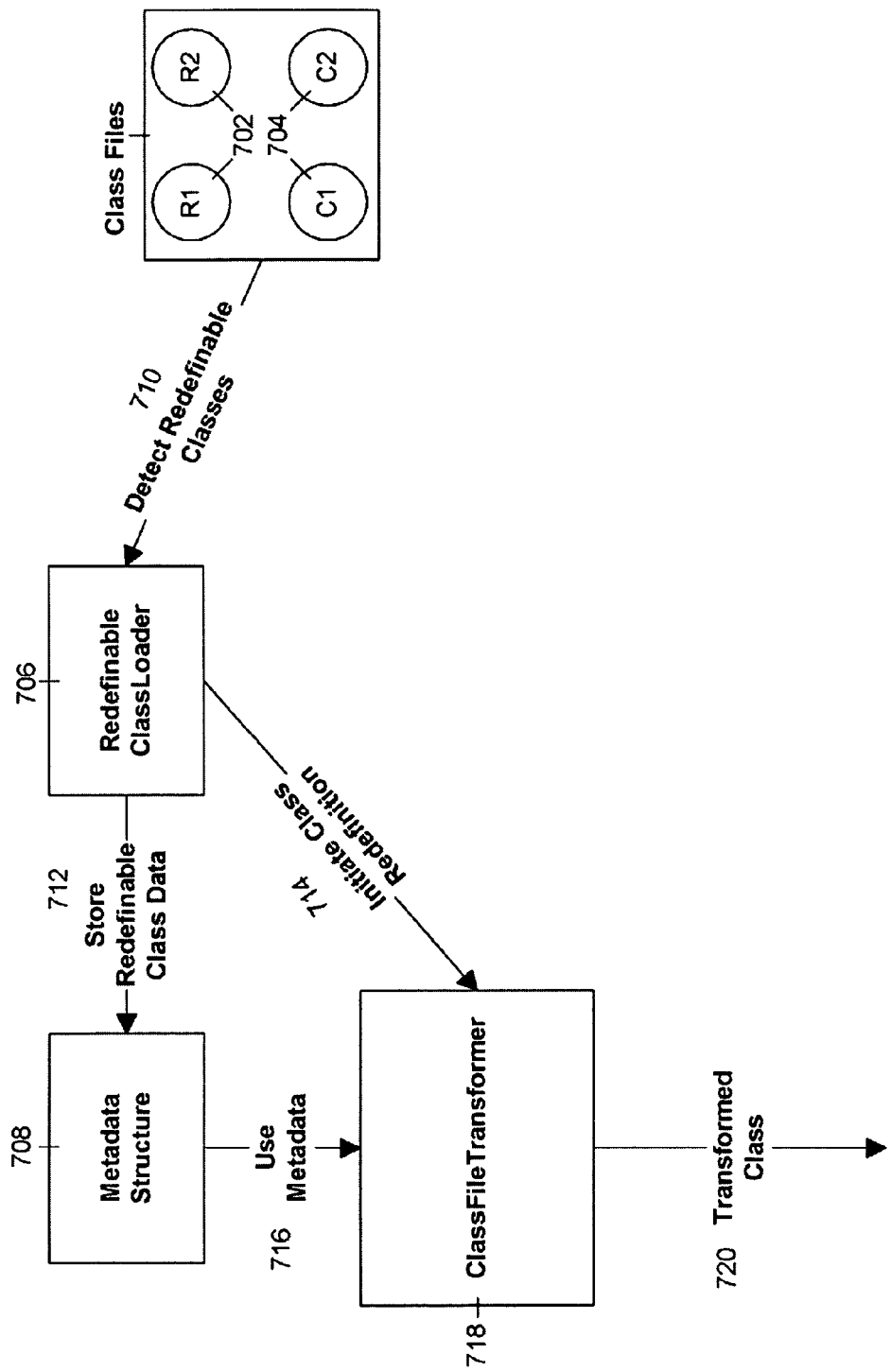
FIG. 7 shows a system in accordance with an embodiment.

FIG. 7 shows a system in accordance with an embodiment. In one embodiment, redefinable classes 702 are detected 710 from among other classes 704 using a redefinable classloader 706. The redefinable classloader stores 712 redefinable class data in a metadata structure 708. Each time a class is redefined to create a redefined class, the redefined class is also stored in the metadata structure. The metadata structure indexes each redefinition. The metadata structure also indexes each member of each class version and distinguishes between the members of each class version. The redefinable classloader initiates class redefinition 714. A classfiletransformer 718 adds synthetic methods and synthetic fields to the redefinable class using the redefinable class data 716 stored in the metadata structure. The synthetic methods and synthetic fields enable outside code to access the methods and fields of a redefined class even where those methods and fields have been redefined. The classfiletransformer also creates an inner class. The inner class contains the methods which can be called in the class. The inner class indexes the available methods. The classfiletransformer replaces the method bodies of the original methods of the class with calls to the inner class according to the inner class index, creating a transformed class 720. When outside code calls one of the available methods, the redefinable classloader replaces the call with a call to the inner class using the inner class index.

For example, FIG. 8 shows two classes: Base 800 and Sub 816 which is a child of Base. Base contains two fields: _name 802 and _age 804. Base also contains five methods: getName 806, setName 808, getAge 810, setAge 812, and toString 814. Sub contains one field, _ssn 818, and three methods, getSSN 820, setSSN 822, and toString 824. FIG. 9 shows the effect of ClassFileTransformer function on the code of FIG. 8.

In FIG. 9, Base 900 and Sub 930 are transformed to include a number of synthetic members. In one embodiment, the synthetic members include Invoke 918 and 942, AddedFields 916 and 944, and an inner class Version0 920 and 942. The method bodies of each method in Base 906-914 and Sub 934-938 are transformed. Each method now calls a method of the inner class, Version0. The methods of the inner class are copies of the original methods of Base and Sub. The synthetic method Invoke provides the indirection described above for outside code attempting to invoke the methods of Base. A direct call to a method of Base from outside code is replaced by a call to Invoke using the index of methods from the metadata structure. Where outside code attempts to invoke Base.setName it is replaced with Base.Invoke and a method index of 1. Calls to other methods of Base and Sub are redirected similarly.

In FIG. 10, the Base class 1000 is modified to remove two methods, getAge 1012 and setAge 1014, and one field, _age 1004. The Base class is also modified to add two new methods, getId 1018 and setId 1020, and one new field, _id 1006. The shape of Base and Sub must remain the same under Java. In FIG. 11, the transformed Base class conforms to the Java requirement: it contains the same fields and methods as the original Base. As before, the transformed Base class 1100 includes synthetic methods including Invoke 1118, a synthetic field AddedFields 1116, and an inner class Version1 1120. Because two methods are removed in this version of Base, the method Invoke is modified to remove those two methods from its switch statement. Now any outside code which attempts to invoke getAge or setAge receives a NoSuchMethod error. Similarly, any outside code which attempts to invoke the new methods getId and setId are redirected by Invoke to Version1. Just as Version0 contained copies of the methods of the unmodified Base class, Version1 contains copies of the methods of the modified Base class 1122-1128. Base, therefore, behaves as though it were modified, it does not recognize calls to getAge or setAge and does recognize getId and setId, but the shape of Base remains the same.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic environment, other application servers, virtual machines, computing environments, and software development systems may use and benefit from the invention. Similarly, while the examples described herein illustrate how the features may be used in a system-application-level classloader hierarchy, it will be evident that the system, process, and techniques can be used with other types and levels of classloaders. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for dynamically redefining classes in an application server environment operating in one or more microprocessors comprising:
   detecting redefinable classes wherein each redefinable class has a shape and includes one or more redefinable class members;

wherein the shape includes one or more fields or methods of the redefinable class;
storing the redefinable classes in a metadata structure, wherein the metadata structure can store versions of the redefinable classes;
indexing each of the one or more redefinable class members of each redefinable class in the metadata structure, wherein the class members of each version of each redefinable class can be indexed in the metadata structure;
detecting changes to a redefinable class including changes to existing methods in the redefinable class and newly added methods to the redefinable class;
transforming the redefinable class according to the changes detected to the redefinable class, wherein transforming can include adding and updating synthetic members to the redefinable class;
wherein adding synthetic method includes, adding a first synthetic method to the redefinable class, wherein the first synthetic method can access a field using the metadata structure;
creating an inner class for the redefinable class, wherein the inner class contains copies of methods of the redefinable class and the newly added methods; and
editing methods of the redefinable class to call the inner class;
wherein when a quantity of declared fields and/or methods in the redefinable class changes, the transforming step maintains the shape of the redefinable class via one or more of the synthetic members;
receiving a call to a particular redefinable class member of a particular redefinable class; redirecting the call to a particular synthetic member of the particular redefinable class;
and invoking the particular synthetic member using an index value associated with the particular redefinable class member in the metadata structure.

2. The method of claim 1 further comprising:
adding a second synthetic method to the first redefinable class, wherein the second synthetic method can invoke a method using the metadata structure; and adding a synthetic field to the first redefinable class, wherein the synthetic field can index newly added fields and values of the newly added fields.

3. The method of claim 1 wherein indexing redefinable class members comprises: storing each change to each redefinable class as a monotonically increasing class version in the metadata structure; and indexing each member of each class version.

4. The method of claim 3 further comprising:
distinguishing between members of an original class version from members of all subsequent class versions; and parsing redefinable classes without loading the redefinable classes.

5. The method of claim 1 further comprising:
storing changes to redefinable classes in a metadata structure; and
initiating class redefinition.

6. The method of claim 1 further comprising:
wherein a user makes changes to the redefinable classes using an integrated development environment (IDE).

7. A system for dynamically redefining classes in an application server environment comprising:
a computer including a non-transitory computer readable storage medium and processor operating thereon;
an application server executing on the virtual machine;
a redefinable class file wherein the redefinable class has a shape and includes one or more redefinable class members;
wherein the shape includes one or more fields or methods of the redefinable class;
a detection component that detects changes to the redefinable class file including changes to existing methods in the redefinable class file and newly added methods to the redefinable class file;
a storage component including a metadata structure that can store versions of the redefinable class file, wherein each of the one or more redefinable class members of each version of the redefinable class file is indexed in the metadata structure;
a transform component that transforms the redefinable class file according to changes to the redefinable class file detected by the detection component, wherein transforming can include adding and updating synthetic members to the redefinable class file;
wherein adding synthetic members includes:
adding a first synthetic method to the redefinable class file, wherein the first synthetic method can access a field using a metadata structure;
creating an inner class for the redefinable class file, wherein the inner class contains copies of methods of the at least one redefinable class and newly added methods;
and editing methods of the redefinable class file to call the inner class;
wherein when a quantity of declared fields and/or methods in the redefinable class changes, the transforming component maintains the shape of the redefinable class via one or more of the synthetic members; and
wherein when a call to a particular redefinable class member of the redefinable class file is received the call is redirected to a particular synthetic member of the redefinable class file, and the particular synthetic member is invoked using an index value associated with the particular redefinable class member in the metadata structure.

8. The system of claim 7 wherein the detection component:
detects redefinable classes;
stores the redefinable classes in the metadata structure; and
stores changes to the redefinable classes in the metadata structure;
and initiates class redefinition.

9. The system of claim 7 wherein the storage component:
stores each change to the at least one redefinable class as a monotonically increasing class version in the metadata structure; and
indexes each member of each class version.

10. The system of claim 9 wherein the storage component further:
distinguishes between members of an original class version from members of all subsequent class versions; and
parses redefinable classes without loading the redefinable classes.

11. The system of claim 7 wherein the transform component further:
adds a second synthetic method to the at least one redefinable class, wherein the second synthetic method can invoke a method using the metadata structure;
adds a synthetic field to the at least one redefinable class, wherein the synthetic field can index newly added fields and the values of the newly added fields.

12. The system of claim 7 further comprising an Integrated Development Environment (IDE) and wherein a user makes changes to the at least one redefinable class using the IDE.

13. The system of claim 7 wherein the virtual machine is a Java Virtual Machine.

14. A non-transitory computer readable storage medium including instructions stored thereon which, when executed by a computer, cause the computer to perform the steps of:
  detecting redefinable classes wherein each redefinable class has a shape and includes one or more redefinable class members;
  wherein the shape includes one or more fields or methods of the redefinable class;
  storing the redefinable classes in a metadata structure, wherein the metadata structure can store versions of the redefinable classes;
  indexing each of the one or more redefinable class members of each redefinable class in the metadata structure, wherein the class members of each version of each redefinable class can be indexed in the metadata structure;
  detecting changes to a redefinable class including changes to existing methods in the redefinable class and newly added methods to the redefinable class;
  transforming the redefinable class according to the changes detected to the redefinable class, wherein transforming can include adding and updating synthetic members to the redefinable class;
  wherein adding synthetic members includes:
  adding a first synthetic method to the redefinable class, wherein the first synthetic method can access a field using the metadata structure;
  creating an inner class for the redefinable class, wherein the inner class contains copies of methods of the redefinable class and the newly added methods;
  and editing methods of the redefinable class to call the inner class;
  wherein when a quantity of declared fields and/or methods in the redefinable class changes, the transforming step maintains the shape of the redefinable class via one or more of the synthetic members;
  receiving a call to a particular redefinable class member of a particular redefinable class;
  redirecting the call to a particular synthetic member of the particular redefinable class;
  and invoking the particular synthetic member using an index value associated with the particular redefinable class member in the metadata structure.

15. The non-transitory computer readable storage medium of claim 14 further comprising:
  adding a second synthetic method to the first redefinable class, wherein the second synthetic method can invoke a method using the metadata structure;
  and adding a synthetic field to the first redefinable class, wherein the synthetic field can index newly added fields and values of the newly added fields.

16. The non-transitory computer readable storage medium of claim 14 wherein indexing redefinable class members comprises:
  storing each change to each redefinable class as a monotonically increasing class version in the metadata structure;
  and indexing each member of each class version.

17. The non-transitory computer readable storage medium of claim 14 further comprising:
  distinguishing between members of an original class version from members of all subsequent class versions; and
  parsing redefinable classes without loading the redefinable classes.

* * * * *

UNITED STATES PATENT AND TRADEMARK OFFICE
CERTIFICATE OF CORRECTION

Page 1 of 1

PATENT NO. : 8,615,734 B2
APPLICATION NO. : 12/266369
DATED : December 24, 2013
INVENTOR(S) : Susaria et al.

It is certified that error appears in the above-identified patent and that said Letters Patent is hereby corrected as shown below:

On Title page, column 1, under Other Publications, line 3, delete "retreived" and insert -- retrieved --, therefor.

Signed and Sealed this
Twenty-ninth Day of July, 2014

Michelle K. Lee
*Deputy Director of the United States Patent and Trademark Office*